United States Patent [19]

Camuffo

[11] Patent Number: 5,005,857
[45] Date of Patent: Apr. 9, 1991

[54] INDEPENDENT REAR SUSPENSION

[75] Inventor: Sergio Camuffo, Torino, Italy

[73] Assignee: Fait Auto S.p.A., Torino, Italy

[21] Appl. No.: 447,465

[22] Filed: Dec. 7, 1989

[30] Foreign Application Priority Data

Dec. 7, 1988 [IT] Italy .................. 68092 A/88

[51] Int. Cl.⁵ .............................................. B60G 3/04
[52] U.S. Cl. .................................................. 280/690
[58] Field of Search ............... 280/690, 701, 702, 697, 280/688, 699

[56] References Cited

U.S. PATENT DOCUMENTS 4,621,830 11/1986 Kanai ..................... 280/690
4,740,011 4/1988 Mitobe et al. ............ 280/690
4,740,012 4/1988 Kondo et al. ............. 280/690

Primary Examiner—Richard A. Bertsch
Attorney, Agent, or Firm—Sughrue, Mion, Zinn, Macpeak & Seas

[57] ABSTRACT

A rear suspension for motor vehicles includes a cross member (2) for supporting the suspension, which is fixed at its ends (2a), with the interposition of rubber blocks (3), to two side members (4) fixed under the floor of the motor vehicle. The suspension also includes, in association with each rear wheel, a lower arm (15) pivotably mounted at one end on the respective end (2b) of the cross member (2) and at the other end on the respective wheel support (14). The lower end (15) also has a part which extends forwardly from the cross member (2) and is articulated at its front end to an auxiliary support (21) provided with means for fixing it in an adjustable position under the motor vehicle body. The axes of pivoting of the lower arm (15) relative to the body and relative to the wheel support (14) are parallel and inclined at an angle I to the longitudinal axis. An upper transverse strut (27) is articulated at its ends to the cross member (2) and to the wheel support (14) so as to form an articulated quadrilateral with the lower arm (15). The spring-shock-absorber unit (32, 33) is interposed between the lower arm (15) and the end (2a) of the cross member. Finally, an inclined tie rod (34) is connected at its ends to the auxiliary support (21) and to the cross member (2b), and an anti-roll stabilizer bar (36) is supported by means of members (37) dependant from the body and is connected at its ends to the two wheel supports (14).

8 Claims, 3 Drawing Sheets

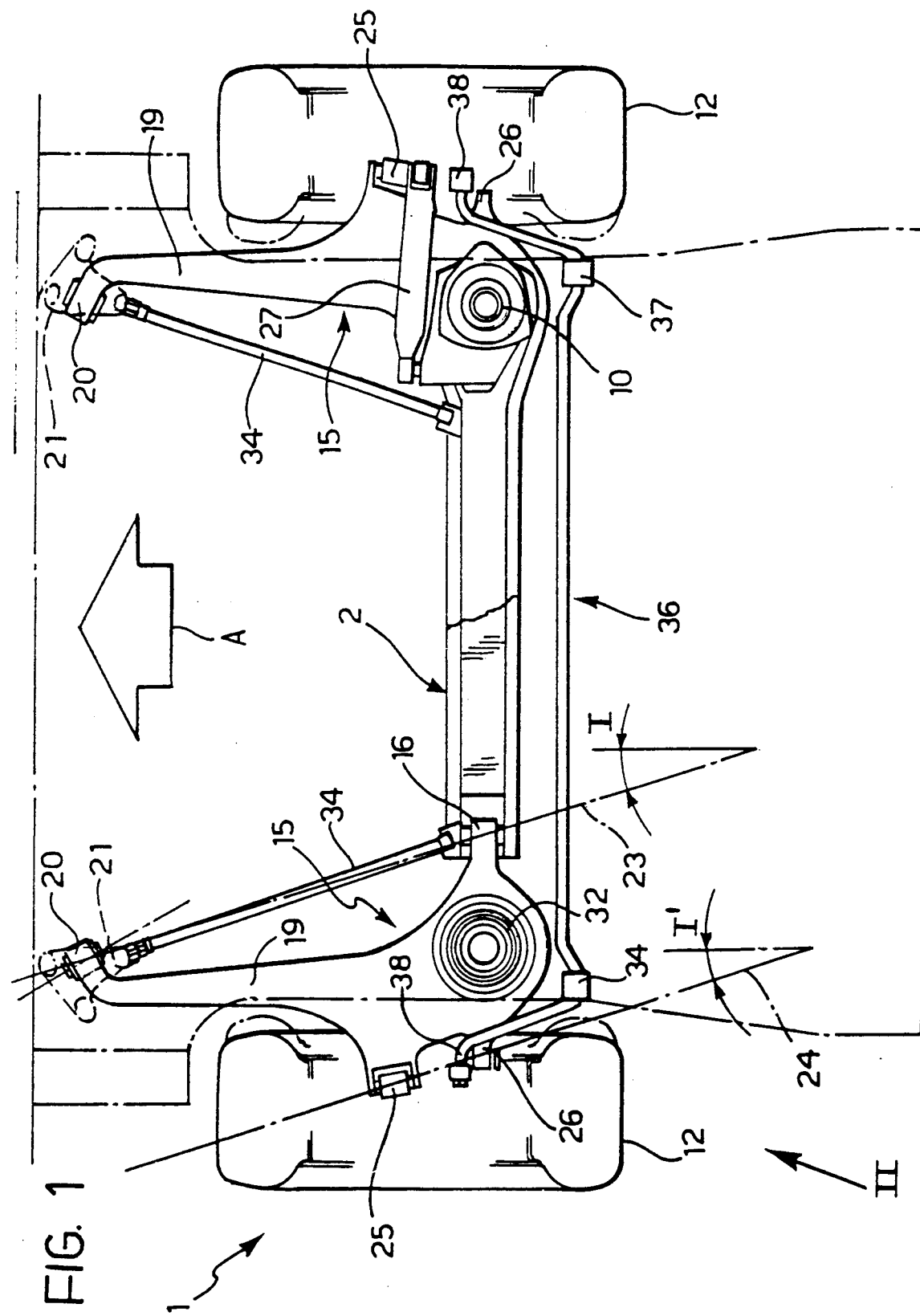

1

INDEPENDENT REAR SUSPENSION

The present invention relates to independent rear suspensions for motor vehicles, of the articulated-quadrilateral type.

The object of the invention is to produce a suspension of the type indicated above which allows the motor vehicle to have good characteristics of travelling comfort and road-holding, which can be assembled entirely before it is fitted to the vehicle on the assembly line and, finally, which is adaptable both to vehicles with front-wheel drive and to vehicles with four-wheel drive.

In order to achieve these and other objects which will be made clear below, the subject of the invention is a rear suspension for motor vehicles, characterised in that it includes a cross member for supporting the suspension, which is fixed at its ends, with the interposition of rubber blocks, to two side members fixed under the floor of the motor vehicle, the suspension also including, in association with each rear wheel:

a lower arm which is pivotably mounted at one end on the respective end of the supporting cross member and at the other end on the respective wheel support, the lower arm having a part which extends forwardly from the cross member with reference to the direction of travel, an auxiliary support provided with means for fixing it in an adjustable position under the motor vehicle body, the front end of the lower arm being articulated to the auxiliary support so that the entire lower arm is pivotable relative to the body of the motor vehicle about an axis lying in a substantially horizontal plane and inclined to the longitudinal axis of the motor vehicle, the axis of articulation between the lower arm and the wheel support being parallel or almost parallel to the first axis, an upper transverse strut mounted pivotably at its ends on the cross member and on the wheel support respectively, so as to form an articulated quadrilateral with the lower arm, resilient shock-absorbing means interposed between the lower arm and the end of the cross member, an inclined tie-rod connected at its ends to the cross member and to the auxiliary support, and an anti-roll stabiliser bar connected at its ends to the two wheel supports and supported by means of members dependant from the body of the motor vehicle.

The axis preferably has an inclination of about 17° to the longitudinal axis of the motor vehicle.

According to a further characteristic, the supporting cross member is behind the axis of the rear wheels with reference to the direction of travel, so that the differential and the drive shafts can be accommodated in the case of rear-wheel drive. The suspension according to the invention is therefore useable whether or not the rear wheels are driving wheels.

Further characteristics and advantages of the present invention will become clear from the description which follows with reference to the appended drawings, provided by way of non-limiting example, in which:

FIG. 1 is a schematic plan view of the suspension according to the invention,

Figure 2:
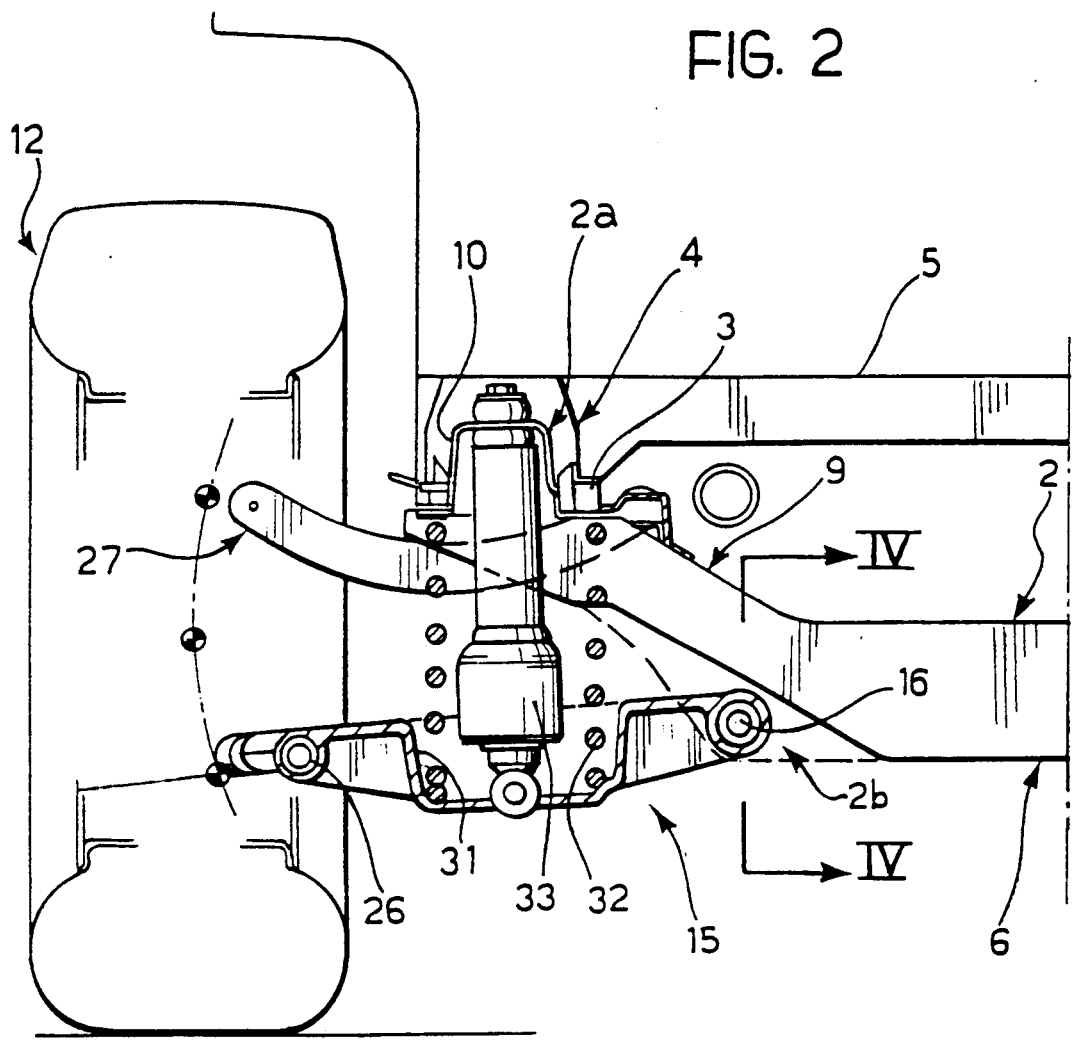
FIG. 2 is a rear view of the suspension taken on the arrow II of FIG. 1.

In the drawings, a rear suspension for a motor vehicle is generally indicated 1 and includes a supporting cross member 2 of pressed sheet metal, whose ends 2a (FIG. 2) are fixed with the interposition of rubber blocks 3 to two side members 4 which form part of the motor vehicle body and extend under the floor 5. In the embodiment illustrated, the cross member 2 has a horizontally-extending central section 6 which is spaced from the floor 5 and is constituted by an omega-sectioned profile 7 (FIG. 3) the bottom of which is connected to a plate 8 by welding. Still in the particular embodiment illustrated, the cross member 2 has two end sections 9 (FIGS. 2 and 3) which are inclined upwardly from the central section 6 and terminate with the ends 2a. Each end 2a of the cross member 2 is provided with a cap-like part 10 with a flange 11. The flange 11 has holes for the engagement of screws for fixing to the respective side member 4, with the possible interposition of rubber blocks 3.

Figure 3:
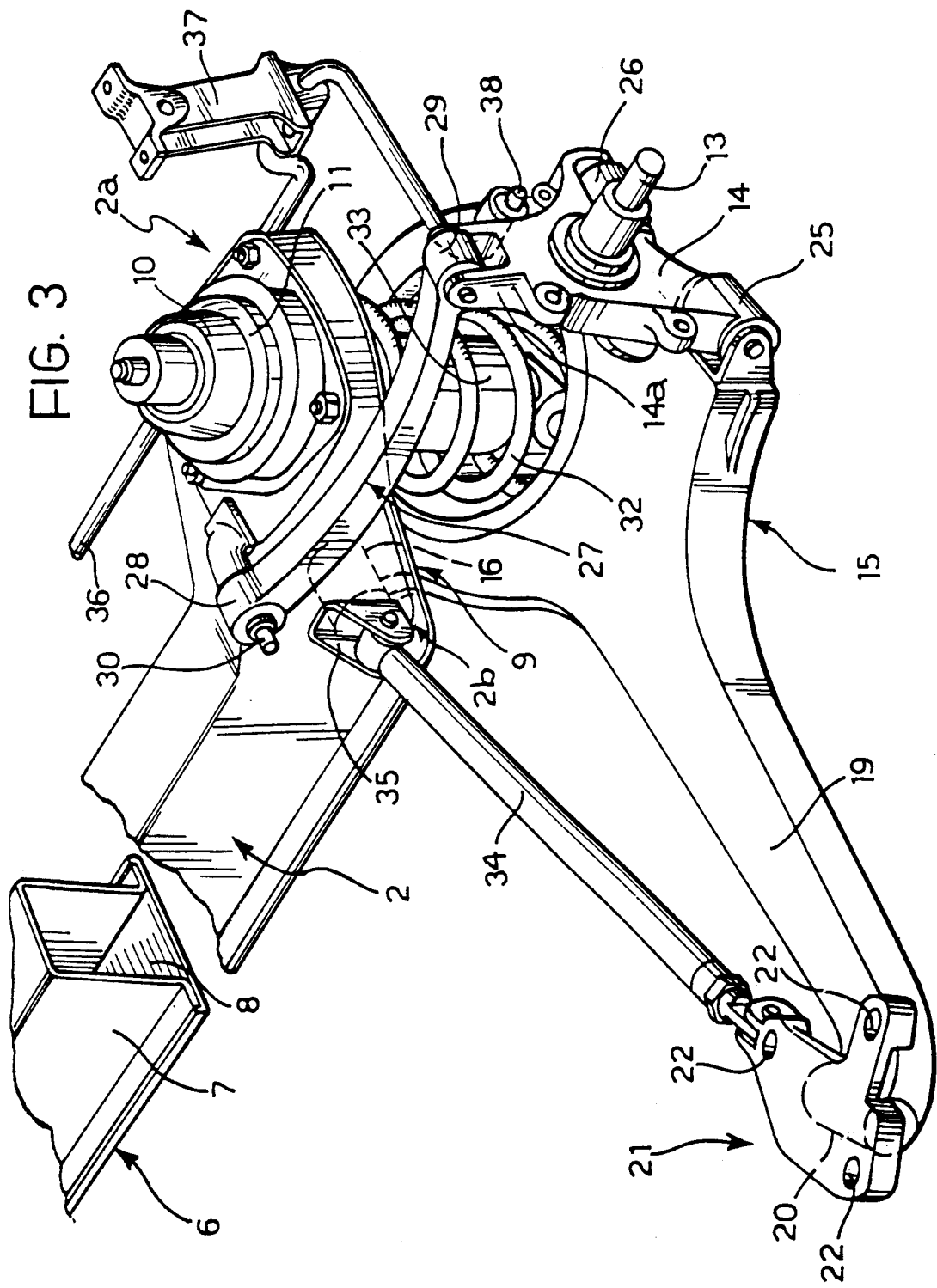
FIG. 3 is perspective view of the left-hand part of the suspension on an enlarged scale.
Figure 4:
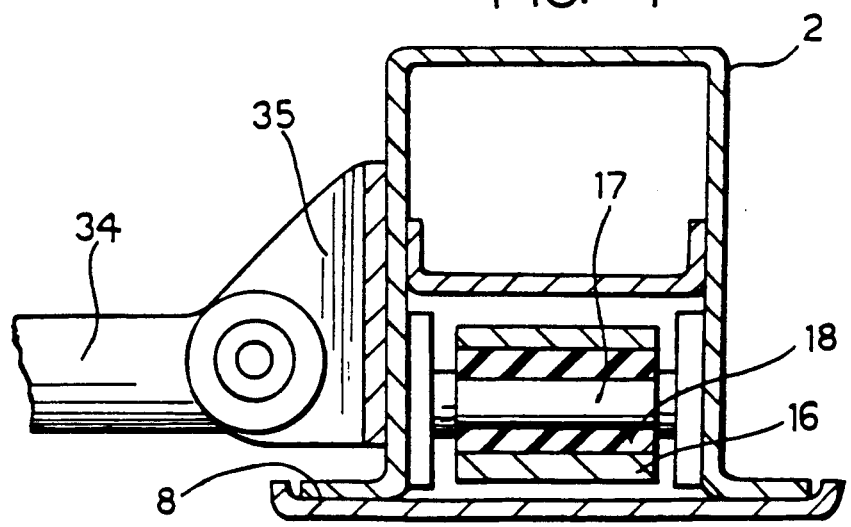
FIG. 4 is a section taken on the line IV-IV of FIG. 2.

Each rear wheel 12 is mounted on a wheel spindle 13 projecting from a support 14 (FIG. 3). The support 14 is connected to the motor vehicle body by means of an articulated quadrilateral. The articulated quadrilateral comprises a lower pivoting arm 15 which includes a bush 16 articulated to a pin 17 (FIG. 4) provided on the inside of the cross member 2, with the interposition of a rubber bush 18. The lower arm 15 has a part 19 which extends forwardly (with reference to the direction of travel indicated by the arrow A in FIG. 1) from the cross member 2. The front end of the part 19 is provided with a bush 20 which is articulated with the interposition of a rubber bush (not illustrated) to an auxiliary support 21 provided with slots 22 for the engagement of screws for fixing it under the motor vehicle body. The slots 22 enable the position of fixing of the auxiliary support 21 to be adjusted. The lower arm 15 is therefore pivotable relative to the motor vehicle body about an axis 23 (FIG. 1) which passes through the centres of the two bushes 16 and 20. This axis is disposed in an approximately horizontal plane and is inclined in plan at an angle I (FIG. 1) to the longitudinal axis of the motor vehicle. The angle I is preferably in the region of 17°.

The wheel support 14 is in turn articulated to the lower arm 15 about an axis 24 which is parallel to the axis 23 and hence also inclined at an angle I' to the longitudinal axis of the motor vehicle. In the embodiment illustrated, the support 14 is articulated to the arm 15 by means of two bush articulations 25, 26, with the interposition of rubber bushes. The centres of the two bushes 25, 26 lie on the axis 24. The axes of the bushes 16-20-25 and 26 are not necessarily parallel to the axes 23 and 24 but may be inclined thereto at suitably predetermined angles. The articulated quadrilateral of the suspension is completed by an upper strut 27 whose ends 28, 29 (FIG. 3) are articulated to an attachment 30 fixed to the outer surface of the cross member 2 and to an appendage 14a of the wheel support 14, respectively. The upper wall of the lower arm 15 has a recessed part 31 which acts as a seat for a helical spring 32 whose upper end bears against the end 2a of the cross member 2. Moreover, a shock-absorber 33 is interposed between the lower arm 15 and the cap part 10 of the end 2a of the cross member.

In order to prevent undesirable movements of the cross member 2 as a result of the stresses to which the suspension is subject in use, an inclined tie-rod 34 is provided whose ends are articulated to an attachment 35 fixed to the outside of the end 2b of the cross member and to the auxiliary support 21, respectively. Finally, the suspension includes a stabilising anti-roll torsion bar, indicated 36, which is supported beneath the body of the motor vehicle by means of dependant members 37 and has end shanks 38 fixed to the respective wheel supports 14.

The cross member 2 is situated behind the axis of the wheels 12, with reference to the direction of travel, so that the differential and the drive shafts can be accommodated in the case of a motor vehicle with rear-wheel drive.

The adjustment of the position of the auxiliary support 21 relative to the body of the motor vehicle enables the toe-in of the wheels to be adjusted consequently.

The deformable quadrilateral kinematics ensure optimal travelling comfort with minimum hysteresis and good shock-absorbing and flexibility characteristics.

As regards acoustic comfort, the entire suspension is situated beneath the structure of the floor and is fixed thereto with the interposition of rubber isolating elements so as to minimise the noise inside the passenger compartment of the motor vehicle.

The quadrilateral kinematics also cause an increase in the angle of rake of the wheel when it is moved upwards relative to the structure of the vehicle, reducing the variation in the angle of wheel-road contact on bends. Moreover, the positioning, orientation and resilient characteristics of the articulation bushes of the various elements of the suspension may be selected so as to ensure optimal control of the geometric movements of the wheels, even under the action of loads, in order to achieve good road-holding characteristics of the vehicle, both in the case of driving wheels and in the case of non-driving wheels. In the case of rear-wheel drive, the cross member 6 may be used for supporting the differential unit.

The unit constituted by the cross member 2, the auxiliary support 21, and the entire suspension can be assembled before it is fitted to the body on the assembly line. Moreover, the fitting to the body is carried out from below.

Obviously, any other unit of known type, such as, for example, a shock-absorber-air-spring unit or a hydraulic jack, could be used instead of the helical spring 32 of the shock-absorber 33.

The suspension according to the invention also lends itself to modification for enabling slight active steering of the rear wheels on bends. In this case, it is necessary to use ball joints instead of the rubber bushes provided on the wheel support for connection to the upper strut and to the lower arm. Obviously, a steering box must also be provided and may be fixed to the cross member 2 for connection to corresponding levers provided on the wheel supports 14 by means of a normal linkage.

The two side members 4 which are intended to support the entire suspension are each formed from a single piece of pressed sheet metal. This characteristic favours precise relative positioning of the various fixing points.

Naturally, the principle of the invention remaining the same, the forms of embodiment and details of construction may be varied widely with respect to those described and illustrated, without thereby departing from the scope of the present invention.

What is claimed is:

1. A rear suspension for a motor vehicle comprising:
   a cross member (2) for supporting the suspension, which is fixed at its ends (2a), with the interposition of rubber blocks (3), to two side members (4) fixed under the floor of the motor vehicle;
   the suspension also including, in association with each rear wheel:
   a lower arm (15) which is pivotably mounted at one end on the respective end (2b) of the supporting cross member (2) and at the other end on the respective wheel support (14), the lower arm (15) having a part (19) which extends forwardly from the cross member (2) with reference to the direction of travel,
   an auxiliary support (21) provided with means (22) for fixing it in an adjustable position under the motor vehicle body, the front end of the lower arm (19) being articulated to the auxiliary support (21) so that the entire lower arm (15) is pivotable relative to the body of the motor vehicle about a pivoting axis (23) lying in a substantially horizontal plane and inclined to the longitudinal axis of the motor vehicle, the axis (24) of pivoting between the lower arm (15) and the wheel support (14) being substantially parallel to the pivoting axis of the lower arm relative to the body of the motor vehicle,
   an upper transverse strut (27) mounted pivotably at its ends on the cross member (2) and on the wheel support (14) respectively, so as to form an articulated quadrilateral with the lower arm (15),
   resilient shock-absorbing means (32, 33) interposed between the lower arm (15) and the end (2a) of the cross member (2),
   an inclined tie-rod (34) connected at its ends to the cross member (2) and to the auxiliary support (21), and an anti-roll stabiliser bar connected at its ends to the two wheel supports (14) and supported beneath the body of the motor vehicle by means of dependant members (37).

2. A suspension according to claim 1, characterised in that the angle (I) of inclination of the pivoting axis of the lower arm (15) to the longitudinal axis of the motor vehicle is set in the region of 17°.

3. A suspension according to claim 1, characterised in that the cross member (2) is behind the axis of the wheels (12) with reference to the direction of travel.

4. A suspension according to claim 1, characterised in that the cross member comprises an omega-sectioned profile of pressed sheet metal the bottom of which is connected to a plate by welding, the cross member having a horizontal central section (6) which is spaced from the floor of the motor vehicle and two end sections (9) which are inclined upwardly from the central section (6) and have two cap-like parts (10), the resilient shock-absorbing means being interposed between a seat formed in the upper surface of the lower arm (15) and the cap-like part (10).

5. A suspension according to claim 1, characterised in that the lower arm (15) is articulated to the cross member (2), to the auxiliary support (21) and to the wheel support (14) with the interposition of rubber bushes.

6. A suspension according to claim 5, characterised in that said two bush joints have oscillating axes which are inclined at predetermined angles to the axis of pivoting of the lower arm relative to the wheel support.

7. A suspension according to claim 5, characterised in that the wheel support (14) is articulated to the lower arm (5) by means of two bush joints (25, 26) whose two centres define the axis of pivoting of the lower arm relative to the wheel support (14).

8. A suspension according to claim 5, characterised in that the rubber bushes interposed between the lower arm and the cross member and between the lower arm and the auxiliary support have oscillating axes which are inclined at predetermined angles to the axis of pivoting of the lower arm relative to the body of the motor vehicle.

* * * * *

UNITED STATES PATENT AND TRADEMARK OFFICE
CERTIFICATE OF CORRECTION

PATENT NO. : 5,005,857
DATED : April 9, 1991
INVENTOR(S) : Sergio Camuffo

It is certified that error appears in the above-indentified patent and that said Letters Patent is hereby corrected as shown below:

On the title page: Item [73] Assignee: Fiat Auto S.p.A., Torino, Italy

Signed and Sealed this

Twelfth Day of April, 1994

Attest:

BRUCE LEHMAN

*Attesting Officer*

*Commissioner of Patents and Trademarks*